(12) United States Patent
Bagwell et al.

(10) Patent No.: US 7,615,153 B1
(45) Date of Patent: Nov. 10, 2009

(54) MICROBIAL BASED CHLORINATED ETHENE DESTRUCTION

(75) Inventors: Christopher E. Bagwell, Aiken, SC (US); David L. Freedman, Clemson, SC (US); Robin L. Brigmon, North Augusta, SC (US); William B. Bratt, Atlanta, GA (US); Elizabeth A. Wood, Marietta, GA (US)

(73) Assignees: Savannah River Nuclear Solutions, LLC, Aiken, SC (US); Clemson University, Clemson, SC (US)

( * ) Notice: Subject to any disclaimer, the term of this patent is extended or adjusted under 35 U.S.C. 154(b) by 0 days.

(21) Appl. No.: 12/151,559

(22) Filed: May 7, 2008

(51) Int. Cl.
*C02F 3/00* (2006.01)
(52) U.S. Cl. .................... 210/601; 210/908; 435/262.5; 435/252.4
(58) Field of Classification Search ................ 210/601, 210/611, 908; 435/262.5, 252.4
See application file for complete search history.

(56) References Cited

U.S. PATENT DOCUMENTS

| 4,094,742 | A | 6/1978 | Bellamy |
| 6,403,084 | B1 | 6/2002 | Chan et al. |
| 6,632,364 | B1 | 10/2003 | Suthersan |
| 2005/0064576 | A1 | 3/2005 | Fennell et al. |

FOREIGN PATENT DOCUMENTS

| EP | 0 864 542 A3 | 3/1998 |
| WO | 2004110933 A2 | 12/2004 |
| WO | WO 2004110933 A2 * | 12/2004 |

* cited by examiner

*Primary Examiner*—Chester T Barry
(74) *Attorney, Agent, or Firm*—J. Bennett Mullinax, LLC

(57) ABSTRACT

A mixed culture of *Dehalococcoides* species is provided that has an ability to catalyze the complete dechlorination of polychlorinated ethenes such as PCE, TCE, cDCE, 1,1-DCE and vinyl chloride as well as halogenated ethanes such as 1,2-DCA and EDB. The mixed culture demonstrates the ability to achieve dechlorination even in the presence of high source concentrations of chlorinated ethenes.

6 Claims, 4 Drawing Sheets

MICROBIAL BASED CHLORINATED ETHENE DESTRUCTION

STATEMENT AS TO RIGHTS TO INVENTIONS MADE UNDER FEDERALLY SPONSORED RESEARCH AND DEVELOPMENT

This invention was made with Government support under Contract No. DE-AC0996-SR18500 awarded by the United States Department of Energy. The Government has certain rights in the invention.

FIELD OF THE INVENTION

This invention is directed to the bioremediation of chlorinated environmental pollutants. More particularly, the invention relates to a method for bioremediation of chlorinated pollutants using a novel mixed culture which includes a plurality of *Dehalococcoides* species which are capable of anaerobic dechlororespiration. The mixed culture of *Dehalococcoides* species demonstrates an ability to achieve the complete dechlorination of polychlorinated ethenes and polychlorinated ethanes to ethene and/or inorganic chloride even in the presence of relatively high concentrations i.e., source concentrations, of trichloroethene (TCE).

BACKGROUND OF THE INVENTION

Chlorinated hydrocarbons represent a class of toxic contaminants frequently found in ground water near industrial sites. Traditional techniques for remediation of toxic waste sites have used physical-chemical approaches such as solvent or surfactant treatments, in situ chemical oxidation, or excavation. However, such approaches are not suitable or cost effective for many sites due to the underlying geo-chemical characteristics, cost considerations, and/or size of contaminant plumes. Accordingly, there is a desire for bioremediation approaches which are relatively inexpensive, non-invasive and are able to convert toxic organic contaminants into non-toxic end products.

Chlorinated hydrocarbons are a class of toxic chemicals found frequently at such contaminated sites. Various chloroethenes and halogenated ethanes have been employed as solvents for many industrial applications. For example, solvents such as TCE have resulted in extensive ground water contamination. Contaminated sites can undergo a partial reductive dechlorination through various naturally occurring abiotic and biotic processes resulting in the formation of toxic intermediates such as dichloroethenes (DCE) and vinyl chloride (VC). The complete detoxification of chlorinated hydrocarbons requires reductive dechlorination to non-chlorinated end products such as ethene.

There does exist within the prior art a variety of microorganisms and remediation protocols which have been shown to achieve a reduction in chlorinated hydrocarbon levels. However, improvements and advancements are needed to increase efficiency, achieve desirable end products, achieve greater tolerance to high levels of contaminants, and address various forms of chlorinated hydrocarbons.

Accordingly, there remains room for improvement and variation within the art.

SUMMARY OF THE INVENTION

The present invention is directed to a mixed culture of *Dehalococcoides* species which are capable of the complete reduction of halogenated compounds under anaerobic conditions. The present invention includes providing a mixed culture of *Dehalococcoides* species to contaminated groundwater or subsurface aquifer so as to achieve a more thorough and aggressive reduction of halogenated compounds useful for in situ remediation efforts.

It is one aspect of at least one embodiment of the invention to provide a method of remediating a subsurface contaminant plume comprising a halogenated compound(s), comprising inoculating the subsurface plume with a mixed culture of *Dehalococcoides* possessing all the identifying characteristics of the ATCC deposit PTA-8259.

It is another aspect of at least one embodiment of the present invention to provide for a process of remediating a subsurface contaminant plume comprising inoculating the subsurface plume with a mixed culture of *Dehalococcoides* species which degrade chlorinated ethenes and ethanes to non-toxic end products. The mixed culture is capable of metabolic activity in the presence of high levels of chlorinated ethenes.

It is another aspect of at least one embodiment of the present invention to provide a method for remediating a subsurface contaminant plume comprising a halogenated compound in which the remediating process includes inoculating the subsurface plume with a consortium of microorganisms, which are directed to chlorinated ethenes including tetrachloroethene (PCE), TCE, DCE, and VC or halogenated ethanes, including 1,2-dichloroethane (DCA) and 1,2-dibromoethane (also referred to ethylene dibromide, or EDB).

These and other features, aspects, and advantages of the present invention will become better understood with reference to the following description and appended claims.

BRIEF DESCRIPTION OF THE DRAWINGS

A fully enabling disclosure of the present invention, including the best mode thereof to one of ordinary skill in the art, is set forth more particularly in the remainder of the specification, including reference to the accompanying drawings.

DESCRIPTION OF THE PREFERRED EMBODIMENT

Reference will now be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention cover such modifications and variations as come within the scope of the appended claims and their equivalents. Other objects, features, and aspects of the present invention are disclosed in the following detailed description. It is to be understood by one of ordinary skill in the art that the present discussion is a description of exemplary embodiments only and is not intended as limiting the broader aspects of the present invention, which broader aspects are embodied in the exemplary constructions.

In describing the various figures herein, the same reference numbers are used throughout to describe the same material, apparatus, or process pathway. To avoid redundancy, detailed descriptions of much of the apparatus once described in relation to a figure is not repeated in the descriptions of subsequent figures, although such apparatus or process is labeled with the same reference numbers.

The present invention is directed to a method and useful microorganisms for achieving the reductive dechlorination of chlorinated hydrocarbons.

Figure 3:
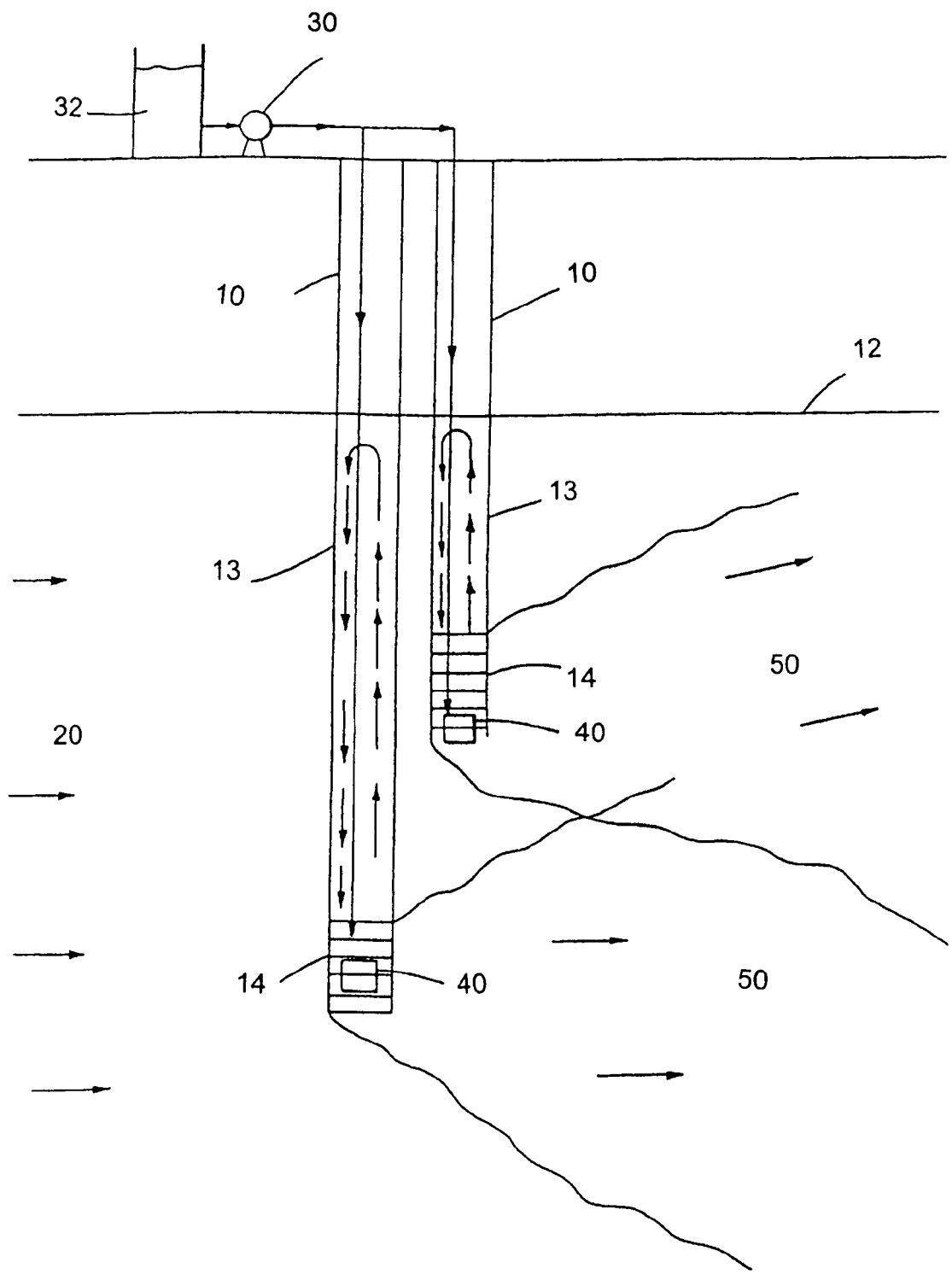
FIG. 3 sets forth a cross sectional view of an in situ product and support for removal of chlorinated ethenes.

As seen in FIG. 3, a cross sectional view of a different embodiment of the present invention is set forth in which injection wells 10 may be installed to extend below a water table 12. Wells 10 may define screens 14 or other permeable sections installed in a contaminated zone 20. The well 10 has an otherwise impermeable section 13 but for the screens 14.

As illustrated, a metering pump 30 may be used to inject the microorganisms and any supporting biomass or growth supplements into one or more of the injection wells 10. Alternatively, a mixing pump 40 may be placed within one or more wells 10 to facilitate mixing of the various reagents. As illustrated, various reagent(s) may be present in the form of a stock solution held within a holding tank 32. A variety of growth supporting biomaterials may be injected into the subsurface along with the consortium of microorganisms. Preferably, the amount of an injected electron donor such as lactate should be at least 50 times greater in terms of electron equivalents compared to the electron equivalents needed for stoichiometric dechlorination. When maintained at such levels, it has been found that reduction of PCE, TCE, DCE, and VC to an inert gas such as ethene or ethane can be accomplished in situ in the reactive zones 50.

The bacterium consortium described herein as PTA-8259 was enriched from a subsurface material collected from a chloroethene plume. The mixed culture consortium can be cultured in a defined synthetic medium under anaerobic conditions.

A novel consortium of microbes was subjected to various tests and procedures for the determination of identifying characteristics. The bacteria mixed culture was deposited under the Budapest Treaty with the American Type Culture Collection (ATCC), P.O. Box 1549, Manassas, Va. 20108 USA on Mar. 7, 2007, and has been assigned Accession No. PTA-8259. Strain PTA-8259 upon grant of this patent, will be released to the public without restrictions or conditions. For the purpose of this invention, the deposited mixed culture having identifying characteristics of PTA-8259 or reflecting an ability for reducing chlorinated ethenes and chlorinated ethanes to ethene, ethane, and inorganic chloride under anaerobic conditions would be effective. Accordingly, variations of the PTA-8259 that may be obtained by mutagenesis or evolution would be effective equivalents of the deposited organisms.

The organisms may be cultured in mass quantities and maintained for use using conventional means. The preferred temperature range for growth is between about 20° C. to about 25° C. with a preferred pH range of about pH 6.5-7.5. The concentration of *Dehalococcoides* in the culture following repeated dechlorination of TCE and PCE is approximately 0.5 to 5 billion cells per milliliter. As is readily appreciated by one having ordinary skill in the art, various practical considerations such as the amount of chlorinated hydrocarbons, the concentration of hydrocarbons, and the method of introducing the microorganisms to the substrate may influence the actual concentration of microorganisms used. As used herein, it is believed that an "effective amount" of the consortium means any quantity of the *Dehalococcoides* mixed culture sufficient to cause a partial or complete remediation of the target compounds.

The following examples are intended to illustrate the invention and are not to be considered as limiting the invention in any manner. All patent and literature references cited herein are hereby incorporated in their entireties for all purposes.

Example 1

The PTA-8259 mixed culture was developed in two phases, each representing a significant dilution of the microcosms (containing sediment and ground water) that was used for inoculation. During the first phase, 3 mL from nine microcosms was distributed to triplicate serum bottles (with a total volume of 160 mL) and adding 91 mL of anaerobic mineral medium per bottle, for a total liquid volume of 100 mL per bottle. The mineral medium is the same as described in Edwards and Gribic-Galic (1994).

Figure 1:
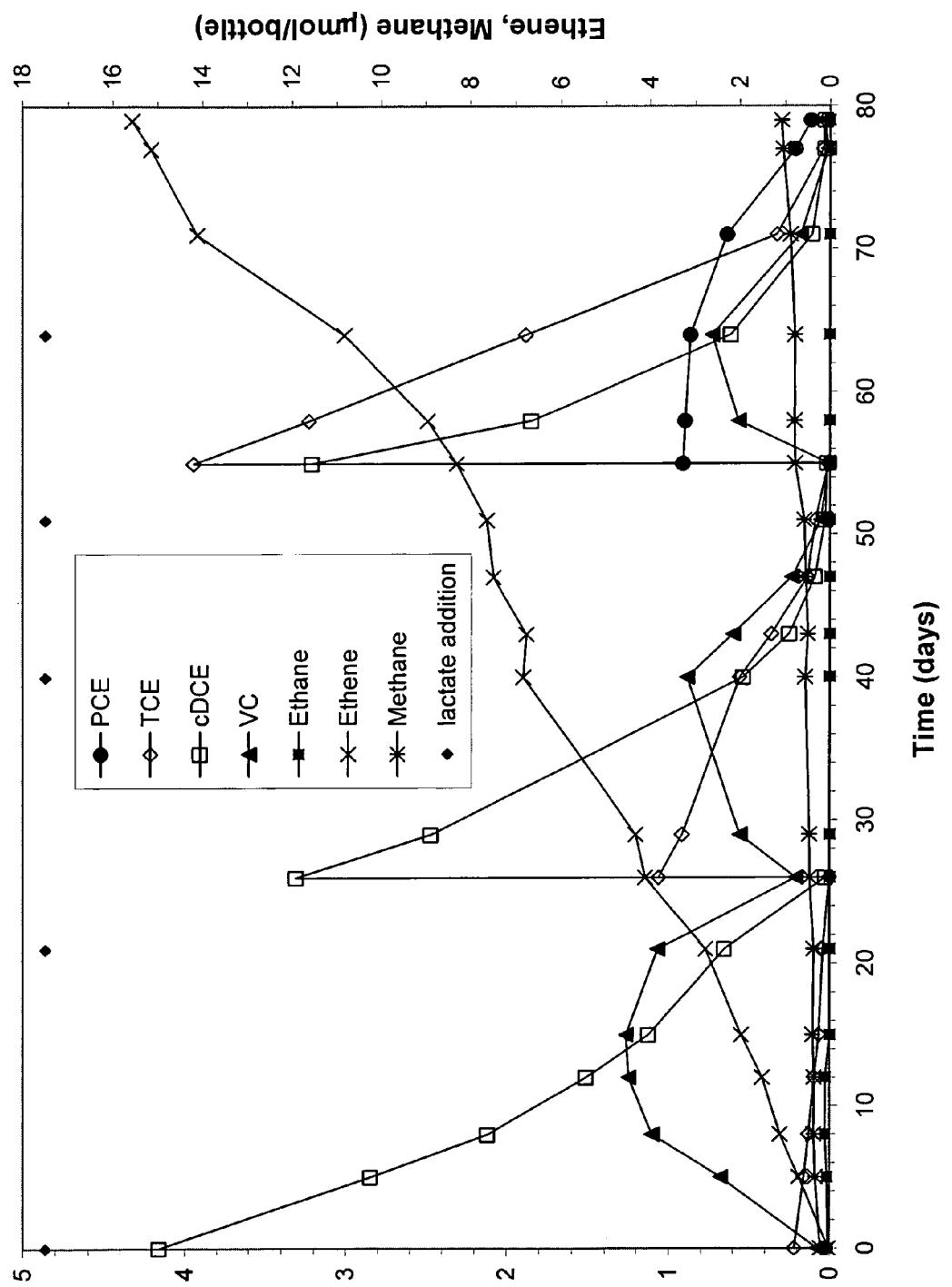
FIG. 1 is a graph setting forth degradation results of various chloroethenes when subjected to treatment using the *Dehalococcoides* consortium of microorganisms.

The initial cis-1,2-dichloroethene (cDCE) and TCE amounts (2.9-4.0 and 0.2-0.3 µmol/bottle, respectively) provided are equivalent to aqueous phase concentrations of 2.6-3.6 and 0.2-0.3 mg/L. Lactate was added to meet the electron donor demand. Over approximately 80 days the bottles were given two additional doses of cDCE and TCE and one dose of PCE. As seen in FIG. 1, the rate of reduction of TCE increased with each addition. The results reported in FIG. 1 indicate that following consumption of TCE and cDCE, dechlorination of PCE began. Accordingly, the PTA-8259 mixed culture demonstrated metabolic activity directed to PCE, TCE, cDCE, and VC with an end conversion product of ethene.

Example 2

Following 79 days of incubation of the first phase enrichment culture described in reference to Example 1, the entire contents of the three respective serum bottles were combined in an anaerobic chamber and then 100 mL samples therefrom were placed in each of three 2.6 liter glass reagent bottles having screw caps and Teflon®-faced septa. Anaerobic mineral media was added to each of the three glass reagent bottles so that each bottle contained approximately 1625 mL of liquid and 975 mL of headspace. The dilution level provided a nearly sediment-free culture with less than 1% of the original microcosms remaining in the glass reagent bottles. The resulting culture comprised the second phase of the enrichment process.

For each bottle of phase two culture, the amount of TCE and PCE added was gradually increased until the highest amount added reached approximately 41.5 mg/L and 13.4 mg/L, respectively (equivalent to 633 and 185 µmol/bottle). As set forth in FIG. 2, it took 30-50 days for these high concentrations of TCE and PCE to be completely dechlorinated to ethene.

As needed, the pH of the mixed cultures was neutralized periodically using NaOH so as to neutralize HCl released during dechlorination. Operation of the bottles beginning on day 87 included settling of particulates (taking approximately 3 hours), removing the cap (inside the anaerobic chamber) and decanting of 150 mL of the clarified liquid. The 150 mL was replaced with fresh medium, new septa were placed in the caps, the bottles were resealed and more chlorinated ethenes and lactate were added. The amount of liquid removed was gradually increased to 300 mL on day 311. Addition of fresh media provided nutrients and avoided accumulation of salt (NaCl from neutralization) and sulfide from reduction of sulfate in the medium.

Figure 2:
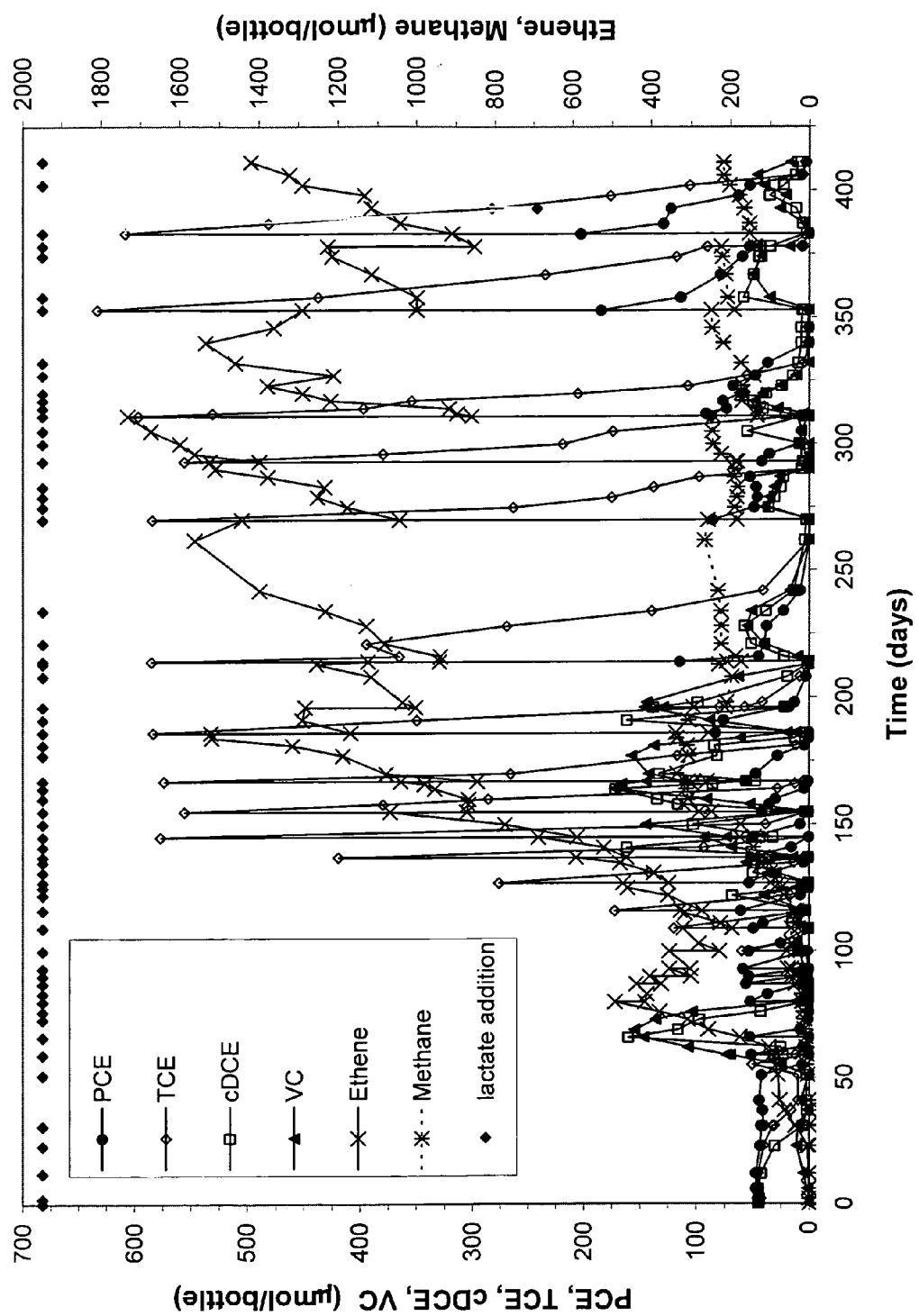
FIG. 2 sets forth degradation characteristics of various chloroethenes following the introduction of the consortium of *Dehalococcoides* microorganisms.

As represented from the data set forth in Examples 1 and 2 and as seen in FIGS. 1 and 2, the PTA-8259 mixed culture shows an ability to rapidly dechlorinate PCE, TCE, cDCE, and VC. The ongoing dechlorination activity occurs despite the extensive dilution of the original microorganisms and is consistent with observations that microorganism population growth is occurring. The dechlorination of the chlorinated ethenes to ethene is believed indicative of a robust population of *Dehalococcoides*.

Example 3

Figure 4:
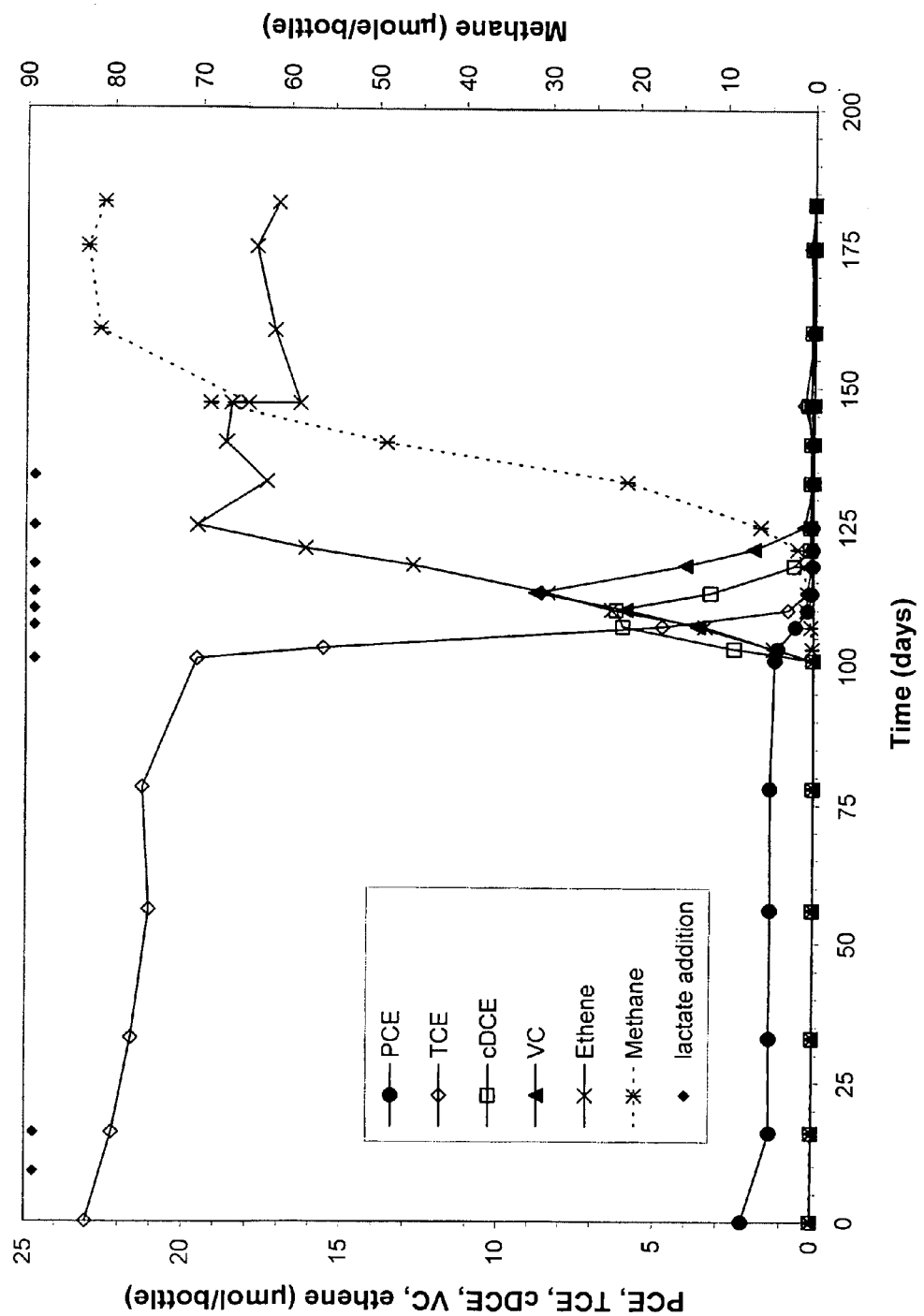
FIG. 4 sets forth degradation results of various chloroethenes when subjected to treatment using the *Dehalococcoides* consortium of microorganisms.

Laboratory samples of contaminated sediment and ground water were established in glass serum bottles under anaerobic conditions. Samples were neutralized with a carbonate buffer amended with PCE (4 mg/L) and TCE (35 mg/L) with lactate being provided as the sole electron donor. At day 100, a consortium of the PTA-8259 mixed culture microorganisms was added to the samples. As seen in reference to FIG. 4, a complete degradation of PCE and TCE occurred for samples amended with a 1% inoculum density (volumetric basis). As seen in FIG. 4, all of the TCE was converted to ethene with only a transient accumulation of chlorinated byproducts. Following degradation of TCE, PCE was then degraded to completion.

While not separately set forth, a comparison under conditions similar to those provided in Example 3 has been made using a commercially marketed *Dehalococcoides* bioaugmentation culture designated KB-1 by GeoSyntec/SiRem. Results indicate that dechlorination following addition of the PTA-8259 culture was equally fast or faster in comparison to addition of the commercially available product. Furthermore, addition of the PTA-8259 culture yielded complete dechlorination while incomplete dechlorination was observed when using the commercially available product.

It has also been established that commercially available DNA extraction and quantitative PCR methodologies allow for the identification and quantification of *Dehalococcoides* specific 16S rRNA gene copies from dechlorinating mixed cultures. Such techniques allowed species verification and enabled calculations of population density of various *Dehalococcoides* using the methodology set forth in He et al, 2003. It is believed that similar methodologies may be deployed in field remediation efforts so as to monitor the population size and health of the *Dehalococcoides* inoculates so as to maintain appropriate growth conditions for efficient bioremediation.

While not separately set forth, it is believed that the mixed culture of microorganisms corresponding to ATCC Accession No. PTA-8259, including mutants thereof, could be cultivated in a bioreactor. Accordingly, contaminants which may require bioremediation including PCE, TCE, cDCE, 1,1-DCE, vinyl chloride, 1,2-DCA, and EDB could be introduced into the bioreactor for bioremediation.

Although preferred embodiments of the invention have been described using specific terms, devices, and methods, such description is for illustrative purposes only. The words used are words of description rather than of limitation. It is to be understood that changes and variations may be made by those of ordinary skill in the art without departing from the spirit or the scope of the present invention which is set forth in the following claims. In addition, it should be understood that aspects of the various embodiments may be interchanged, both in whole or in part. Therefore, the spirit and scope of the appended claims should not be limited to the description of the preferred versions contained therein.

That which is claimed:

1. A method of remediating a subsurface contaminant plume comprising:
    introducing a mixed culture of *Dehalococcoides* selected from the strain consisting of ATCC Deposit PTA-8259 into a subsurface region contaminated with a chlorinated ethene or halogenated ethane.

2. The method according to claim 1 comprising the additional step of maintaining anaerobic conditions in association with the *Dehalococcoides* strain.

3. The method according to claim 1 wherein said chlorinated ethene is selected from the group consisting of PCE, TCE, cDCE, 1,1-DCE, vinyl chloride, and combinations thereof, and said chlorinated ethane is selected from the group consisting of 1,2-DCA and EDB, and combinations thereof.

4. A mixed culture of *Dehalococcoides* microorganisms having the ATCC Accession No. PTA-8259, or mutants thereof, wherein the mixed culture of microorganisms retain the property of metabolizing chlorinated ethenes selected from the group consisting of PCE, TCE, cDCE, 1,1-DCE, vinyl chloride, and combinations thereof, and halogenated ethane is selected from the group consisting of 1,2-DCA and EDB, and combinations thereof.

5. A process for biodegradation of a material selected from the group consisting of PCE, TCE, cDCE, 1,1-DCE, vinyl chloride, 1,2-DCA, EDB and combinations thereof comprising cultivating a mixed culture of microorganisms according to claim 4 and introducing said mixed culture into a subsurface region having said materials therein.

6. A process for bioremediation of material selected from the group consisting of PCE, TCE, cDCE, 1,1-DCE, vinyl chloride, 1,2-DCA, EDB and combinations thereof comprising cultivating said mixed culture of *Dehalococcoides* microorganisms having ATCC Accession No. PTA-8259, or mutants thereof, in a bioreactor and introducing said material into said bioreactor.

* * * * *